W. McMILLIN.
EGG TURNING TRAY FOR INCUBATORS.
APPLICATION FILED FEB. 21, 1912.
1,058,884.
Patented Apr. 15, 1913.
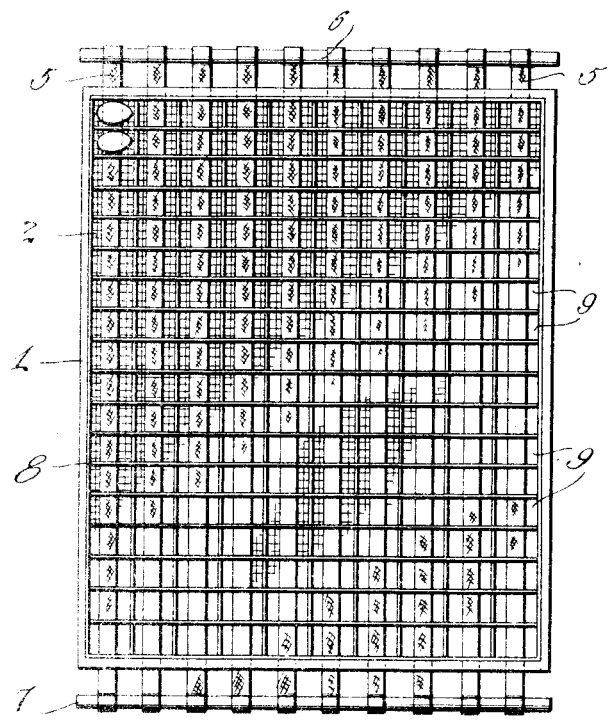
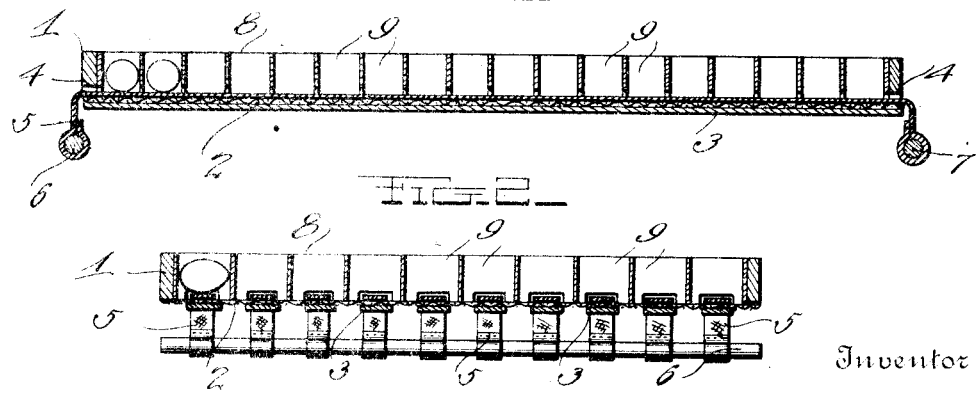
Witnesses
J. R. Pierce
S. M. McColl
Inventor
William McMillin
by H. B. Willson & Co.
Attorneys

UNITED STATES PATENT OFFICE.

WILLIAM McMILLIN, OF MAYSVILLE, MISSOURI.

EGG-TURNING TRAY FOR INCUBATORS.

1,058,884.  Specification of Letters Patent.  Patented Apr. 15, 1913.

Application filed February 21, 1912. Serial No. 679,144.

*To all whom it may concern:*

Be it known that I, WILLIAM McMILLIN, a citizen of the United States, residing at Maysville, in the county of DeKalb and State of Missouri, have invented certain new and useful Improvements in Egg-Turning Trays for Incubators; and I do declare the following to be a full, clear, and exact description of the invention, such as will enable others skilled in the art to which it appertains to make and use the same.

This invention relates to an egg turner for incubator trays.

The object of the invention is to provide a simple, inexpensive egg holding tray such as is ordinarily used in incubators and to provide said tray with simple easily operated means for simultaneously turning all of the eggs on the tray, said turning means being operable to partially turn the eggs or to turn them entirely over at the will of the operator.

With this and other objects in view, the invention consists of certain novel features of construction, combination, and arrangement of parts as will be more fully described and claimed, In the accompanying drawings; Figure 1 is a top plan view of an egg tray equipped with this improved turning device; Fig. 2 is a transverse section thereof; Fig. 3 is a longitudinal section thereof.

In the embodiment illustrated a tray is shown constructed of a rectangular wooden frame 1 of a size to fit on the supporting rails of an incubator to which it is to be applied. This frame is provided with a screen wire bottom 2 preferably reinforced with longitudinally extending laterally spaced strips 3 of tin or other suitable material. The end walls of this frame are provided throughout their length with a plurality of spaced longitudinally alined slots 4 for the passage of a number of fabric strips 5 which extend longitudinally of the frame. The ends of these strips 5 extend through the slots 4 and project beyond the opposite ends of the frame and are removably connected with bars or rods 6 and 7 in any suitable manner, being here shown provided at their ends with loops through which the rods 6 are run, adapting the rods to be slipped out when desired. These rods form handles for moving said strips longitudinally and drop down under the tray when not in use. The strips 5 are much narrower than the length of the compartments 9 through which they pass transversely leaving spaces at the opposite side edges of said strips substantially equal to the width of the strip to permit the free passage of heat around the egg, and the supporting strips 3, which are about the same width as the strips 5, being of metal are good conductors of heat. These strips are about five inches longer than the tray and when they are drawn out to their full extent the eggs which rest on the strips within the tray are turned entirely over.

A skeleton egg retaining frame 8 is removably mounted in the frame 1 and has a plurality or series of rectangular compartments 9 arranged over the strips 5, the length of said compartments being arranged transversely of the tray and extending transversely of the frame to provide for the rolling of the eggs disposed therein sidewise when the strips are moved longitudinally and thereby prevent said eggs from being left standing on their ends which is undesirable during the incubating process.

It will be obvious that to effect a complete or partial turning of the eggs it is necessary simply to grasp one of the handles 6 or 7 and exert an outward pull which will move the strips 5 longitudinally and turn the eggs in the compartments accordingly. Either end of the tray may be disposed at the front of the incubator the tray being turned end for end at least once a day.

The frame 8 may be removed on the 18th day to provide ample space for the chicks to come out of the shells and, if desired, the strips may be also withdrawn after the rods 7 have been slipped out of the loops thus preventing the strips from becoming soiled during the hatch. It will thus be observed that when it is desired to remove the egg turning means the formation thereof in strips will facilitate said removal without materially molesting the eggs one strip at a time being preferably withdrawn.

I claim as my invention:

1. An incubator tray having the end walls thereof provided with a plurality of spaced longitudinally alined openings, an egg retaining frame arranged in said tray and having rectangular individual egg compartments the length of which extends in a plane at right angles to the length of the tray, strips of fabric extending longitudinally of the tray bottom transversely across the lower ends of said compartments, the ends of said strips projecting through said openings in the tray ends, said strips being spaced from each other and with spaces between their side edges and the end walls of the rectangular egg compartments, a foraminous bottom arranged in said tray below said strips, and metal reinforcing strips arranged under said fabric strips and of approximately the same width as said fabric strips.

2. An egg tray for incubators comprising a frame having a bottom composed of foraminous material, the end members of said frame being provided with a plurality of longitudinally spaced apertures, fabric strips of greater length than the frame extending longitudinally across the bottom thereof with their ends projecting through the openings in the end walls of the frame, and detachable rods connecting the ends of said fabric strips.

3. An egg tray for incubators comprising a frame having a bottom composed of foraminous material with the end members of said frame provided with a plurality of longitudinally spaced apertures, fabric strips of greater length than the frame extending longitudinally across the bottom thereof with their ends projecting through the openings in the end walls of the frame and having loops formed thereon, rods removably engaged with said loops to connect the ends of said strips, and an egg retaining frame arranged within said tray over said strips, said frame being provided with a plurality of compartments the walls of which are apertured to span the strips.

In testimony whereof I have hereunto set my hand in presence of two subscribing witnesses.

WILLIAM McMILLIN.

Witnesses:
George Price,
Thomas Strong.